United States Patent
Chung

(10) Patent No.: US 7,543,891 B2
(45) Date of Patent: Jun. 9, 2009

(54) DEVICE FOR STOOPING CAR HEADRESTS

(75) Inventor: Hae Il Chung, Incheon (KR)

(73) Assignee: Woobo Tech Co., Ltd., Pyungtack-si, Kyunggi-do (KR)

( * ) Notice: Subject to any disclaimer, the term of this patent is extended or adjusted under 35 U.S.C. 154(b) by 173 days.

(21) Appl. No.: 11/587,739

(22) PCT Filed: Apr. 26, 2005

(86) PCT No.: PCT/KR2005/001197

§ 371 (c)(1),
(2), (4) Date: Oct. 26, 2006

(87) PCT Pub. No.: WO2005/113286

PCT Pub. Date: Dec. 1, 2005

(65) Prior Publication Data

US 2007/0236069 A1    Oct. 11, 2007

(30) Foreign Application Priority Data

Apr. 26, 2004   (KR) .................... 10-2004-0028718
Apr. 25, 2005   (KR) .................... 10-2005-0034251

(51) Int. Cl.
*A47C 7/38* (2006.01)
(52) U.S. Cl. ............. 297/408; 297/378.12; 297/378.14; 297/410
(58) Field of Classification Search ................ 297/404, 297/408, 410, 378.12, 378.14
See application file for complete search history.

(56) References Cited

U.S. PATENT DOCUMENTS

| 4,596,403 A | * | 6/1986 | Dieckmann et al. ......... 280/751 |
| 4,674,797 A | | 6/1987 | Tateyama |
| 4,711,494 A | * | 12/1987 | Duvenkamp ................. 297/403 |
| 5,052,754 A | * | 10/1991 | Chinomi ..................... 297/408 |
| 5,669,668 A | | 9/1997 | Leuchtmann |
| 5,906,414 A | * | 5/1999 | Rus ........................... 297/408 |
| 5,971,467 A | | 10/1999 | Kayumi et al. |
| 6,000,760 A | * | 12/1999 | Chung ........................ 297/408 |
| 6,050,633 A | * | 4/2000 | Droual ........................ 297/61 |
| 6,499,805 B1 | * | 12/2002 | Watadani .................... 297/408 |
| 6,726,283 B2 | * | 4/2004 | Schambre et al. ........... 297/410 |
| 6,880,890 B1 | * | 4/2005 | DeBrabant .................. 297/408 |
| 7,325,877 B2 | * | 2/2008 | Brockman et al. .......... 297/408 |
| 2002/0084686 A1 | * | 7/2002 | Takata ........................ 297/408 |
| 2006/0061187 A1 | * | 3/2006 | Gauthier et al. ............. 297/408 |

FOREIGN PATENT DOCUMENTS

| JP | 2000-225036 | 8/2000 |
| KR | 97-61492 | 12/1997 |

* cited by examiner

Primary Examiner—Rodney B White
Assistant Examiner—Sarah B. McPartlin
(74) Attorney, Agent, or Firm—Dilworth & Barrese, LLP

(57) ABSTRACT

A device for stooping car headrests is provided. The device includes a housing wherein a stay of a car headrest is pivotably coupled thereto, a main spring installed in the housing to bias the stay and the headrest in the forward direction, an arresting member pivotably and resiliently fixed to the housing for releasably holding the stay and a check member having a release means and pivotably and resiliently coupled to the arresting member for controlling movement of the arresting member.

18 Claims, 18 Drawing Sheets

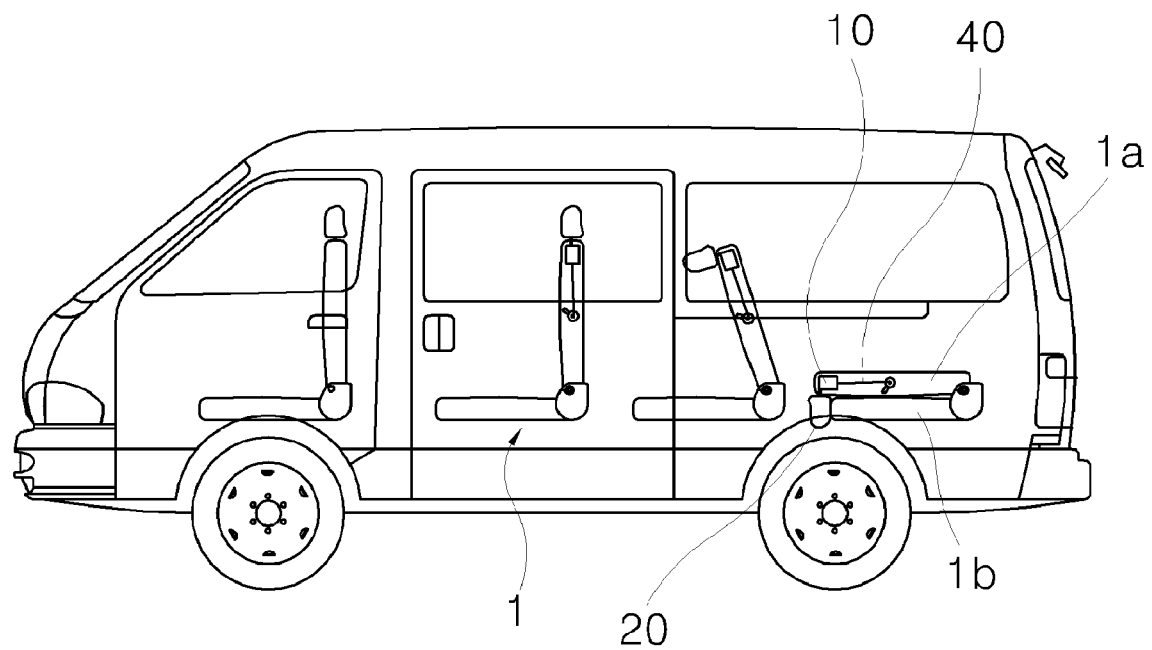
[Fig. 1]

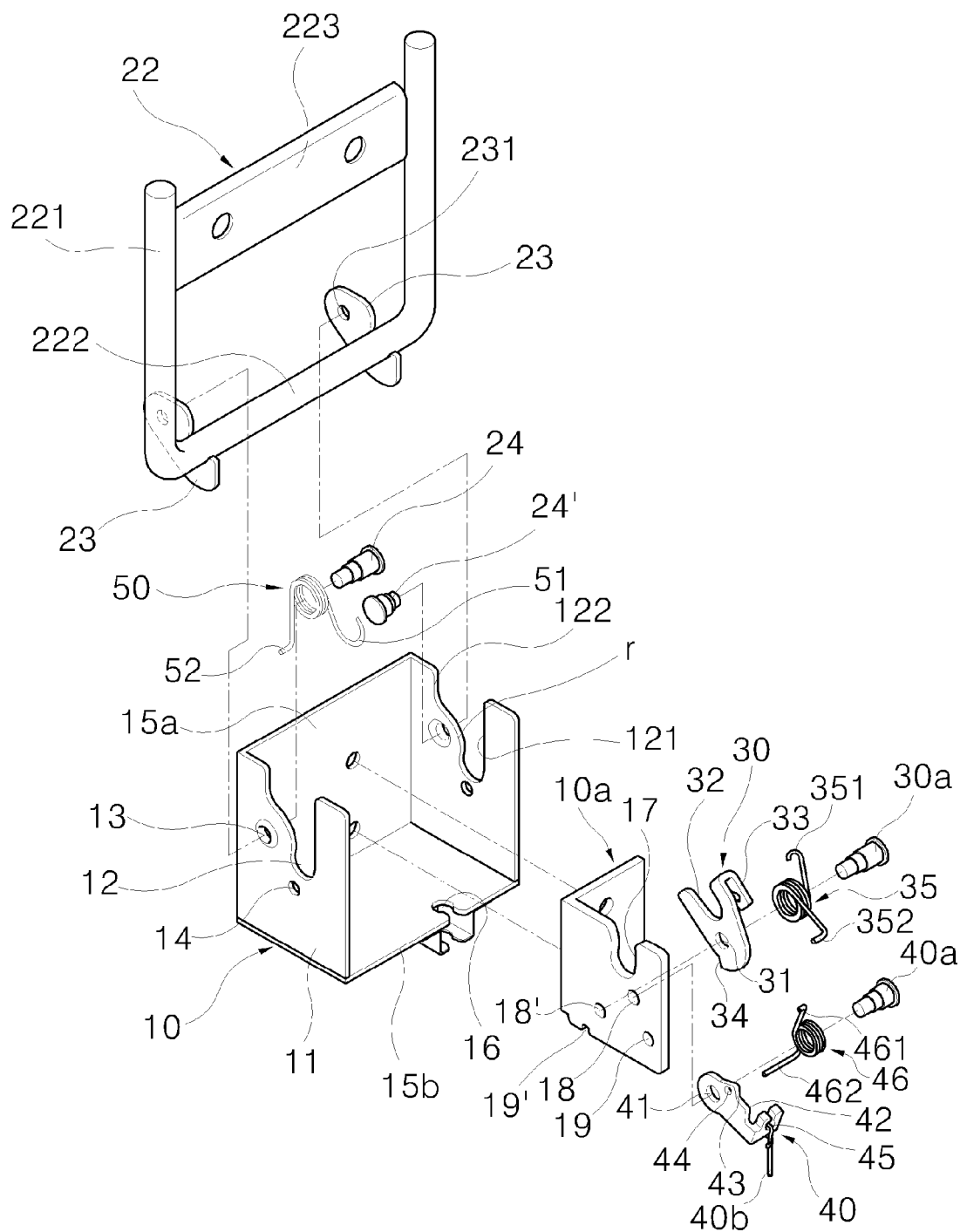
[Fig. 2]

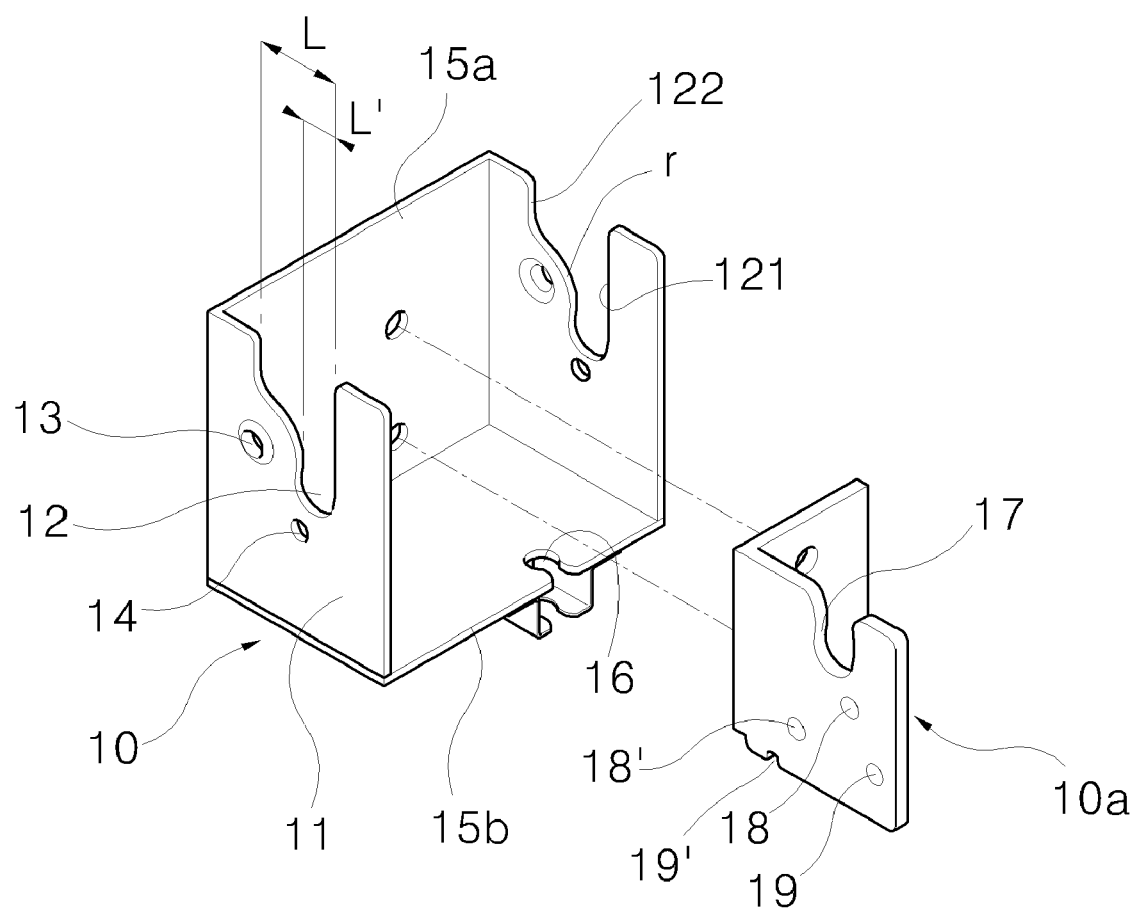

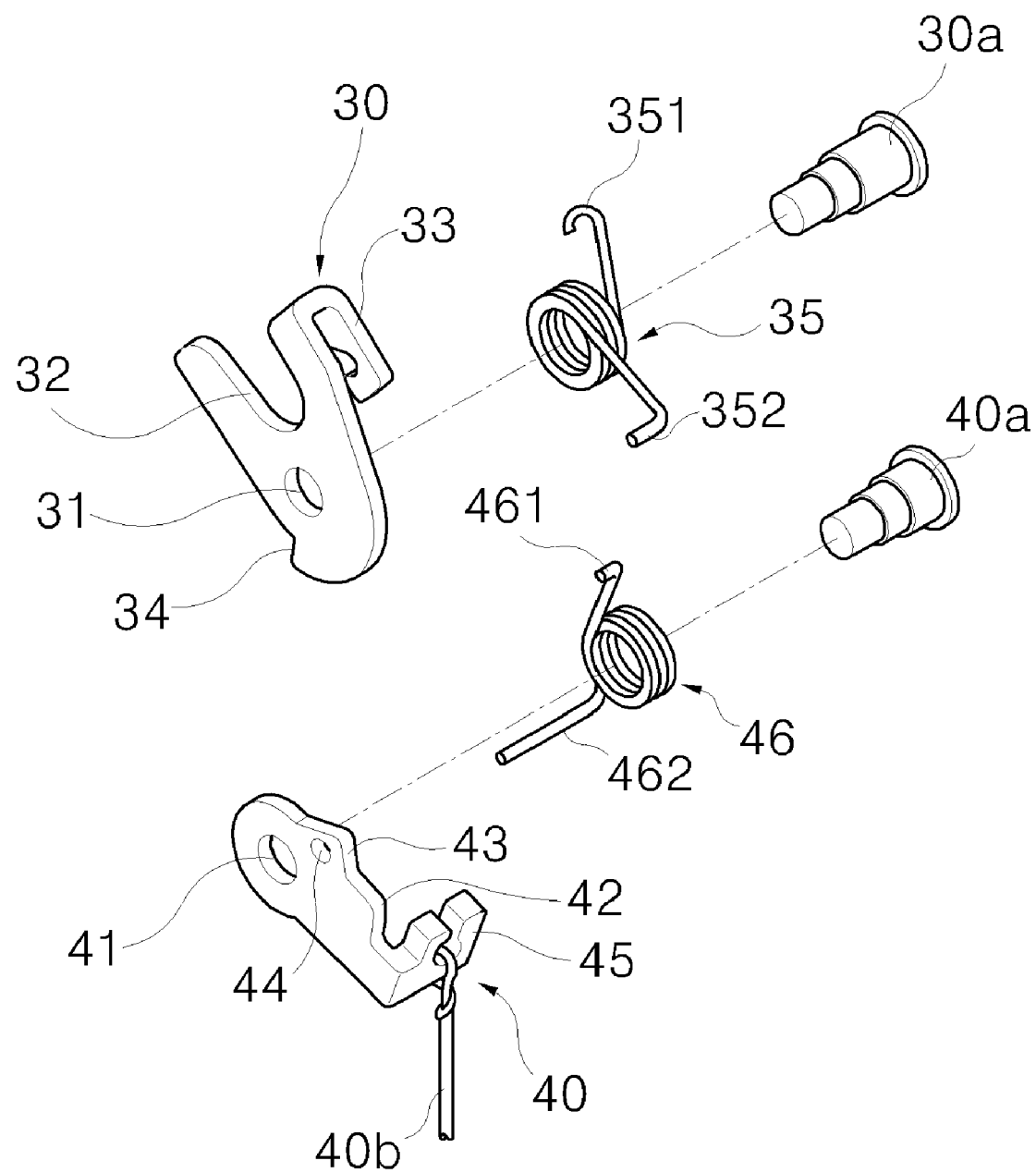
[Fig. 4]

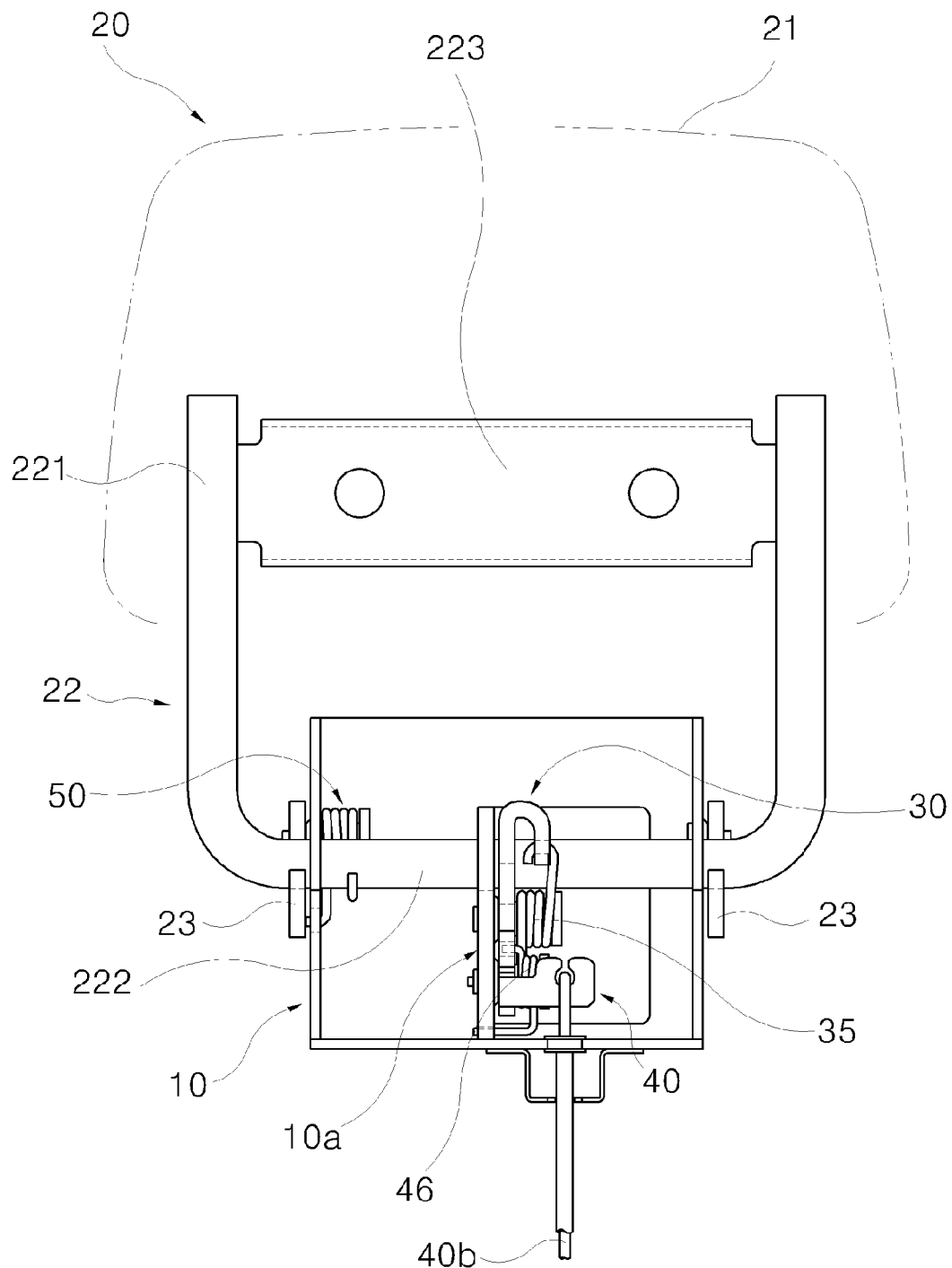
[Fig. 5]

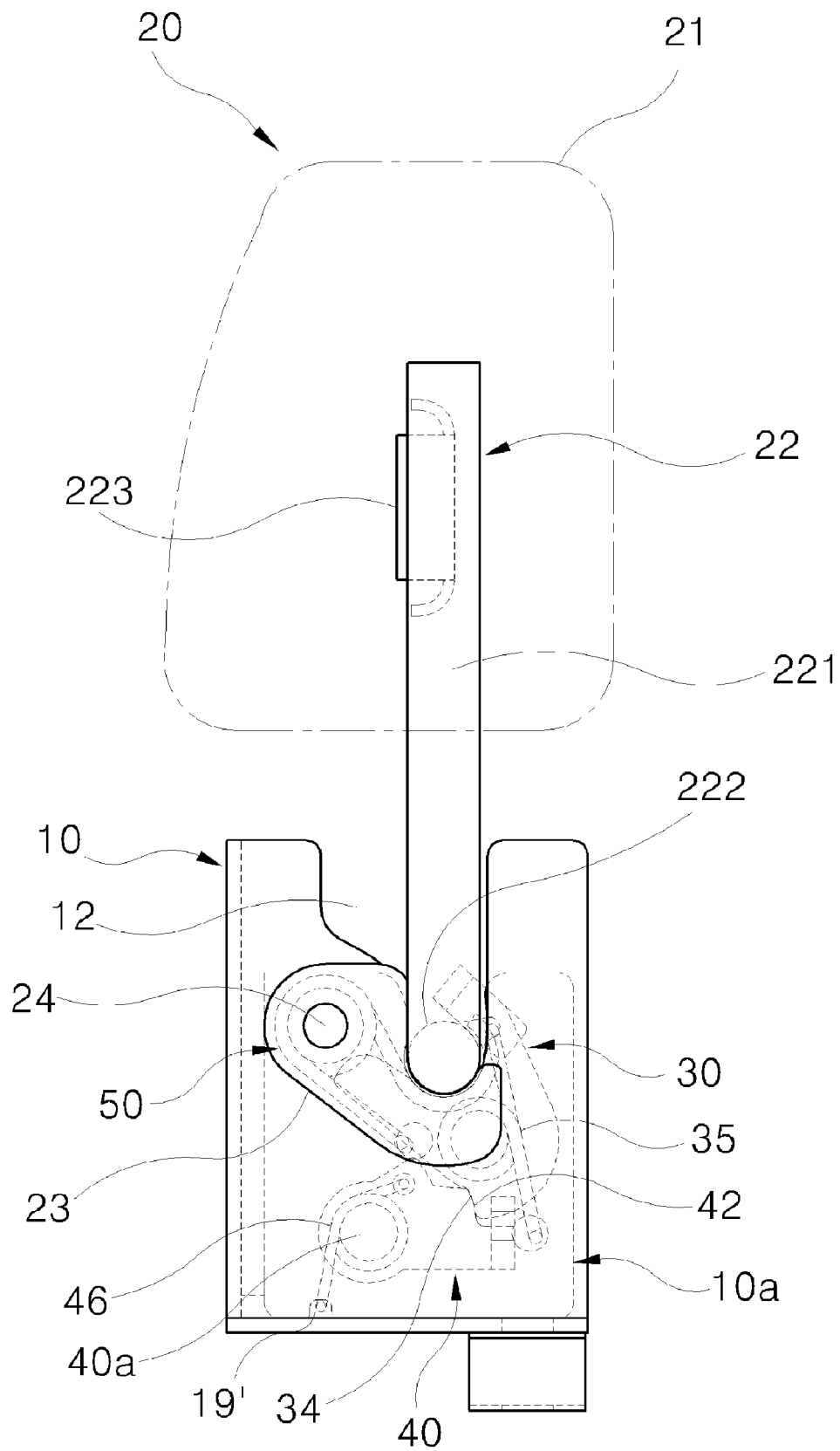

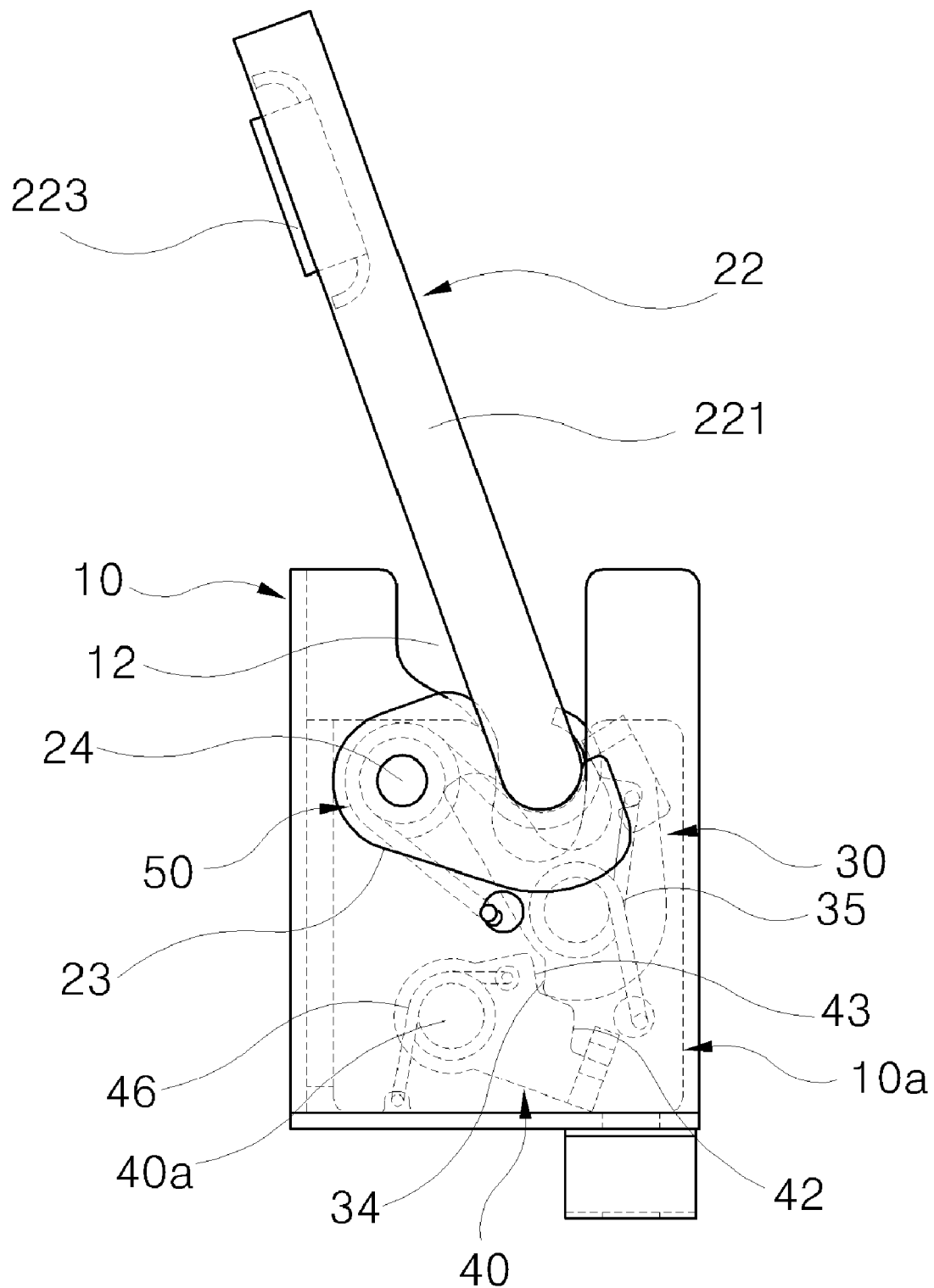
[Fig. 7]

[Fig. 8]
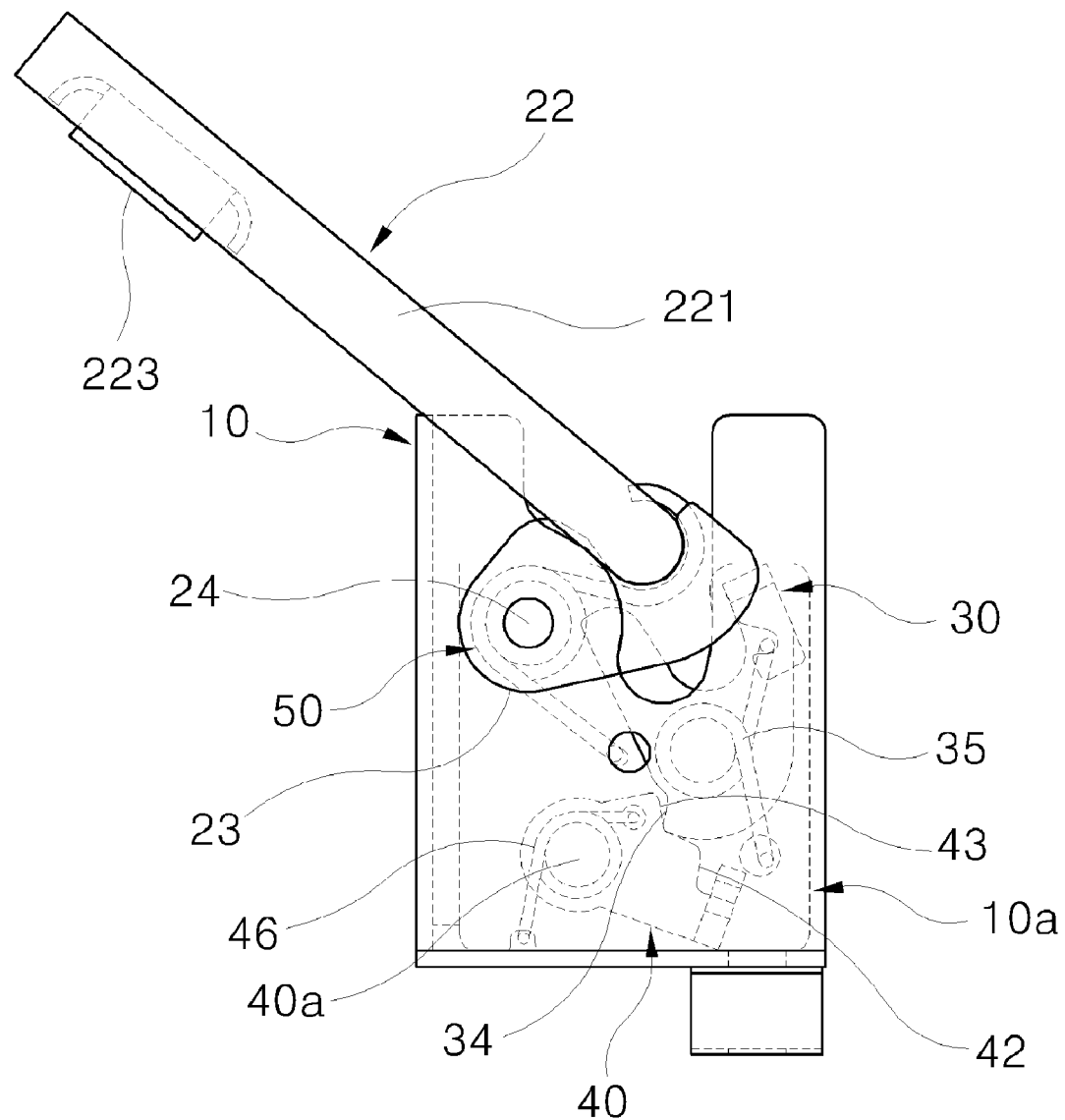

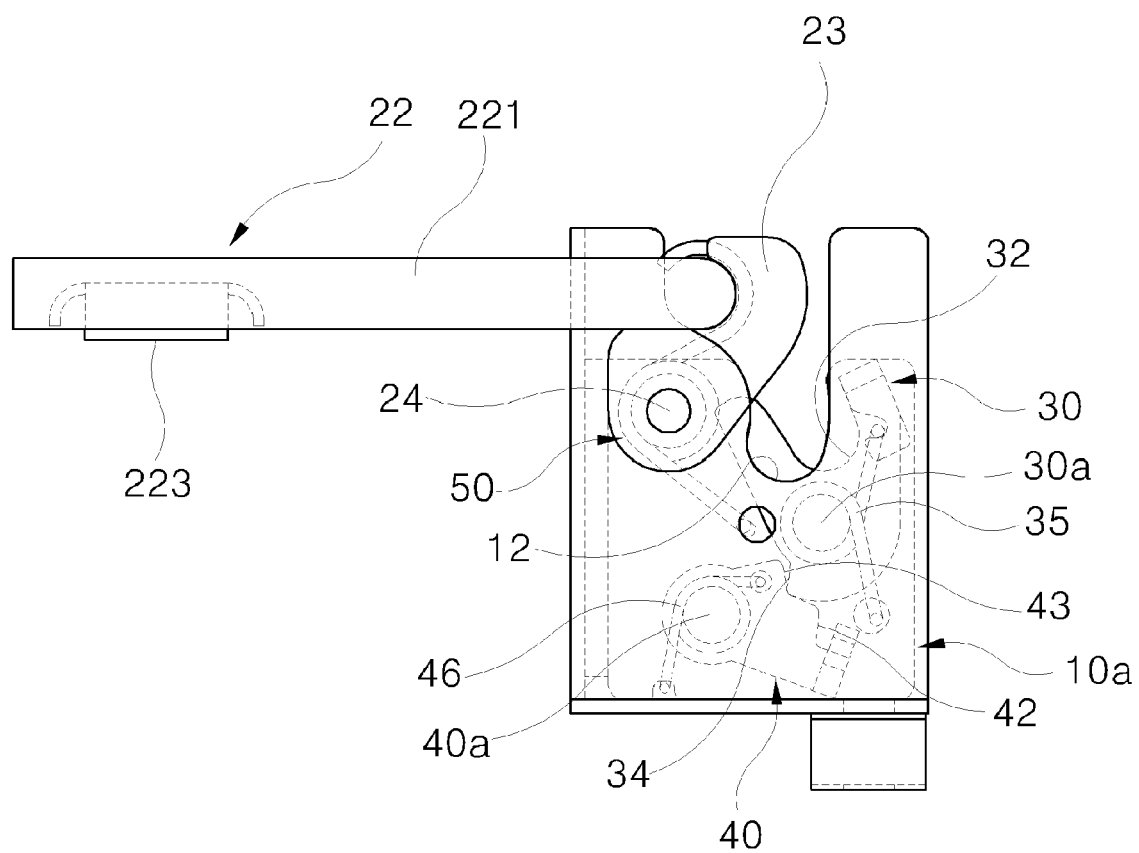
[Fig. 9]

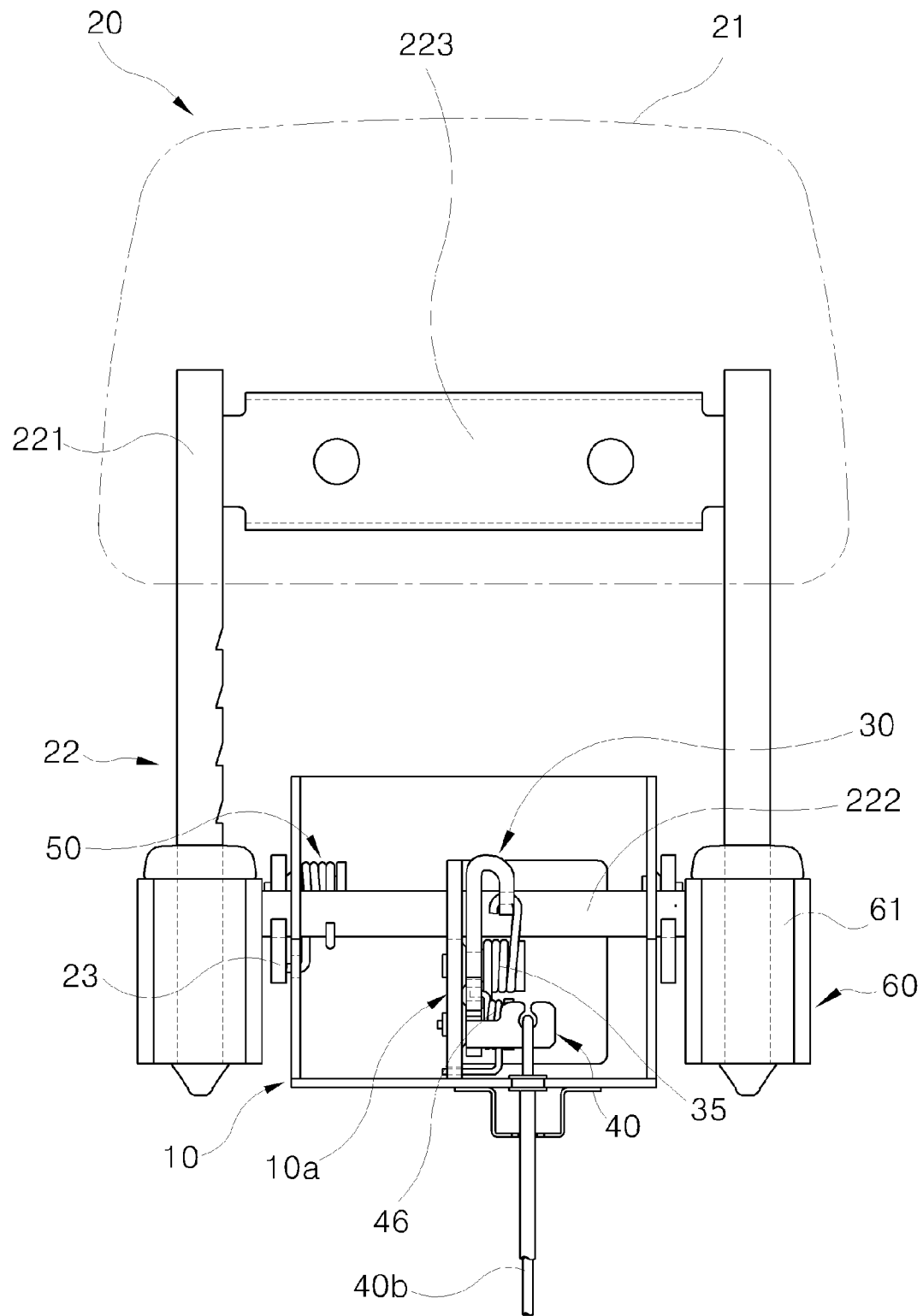
[Fig. 10]

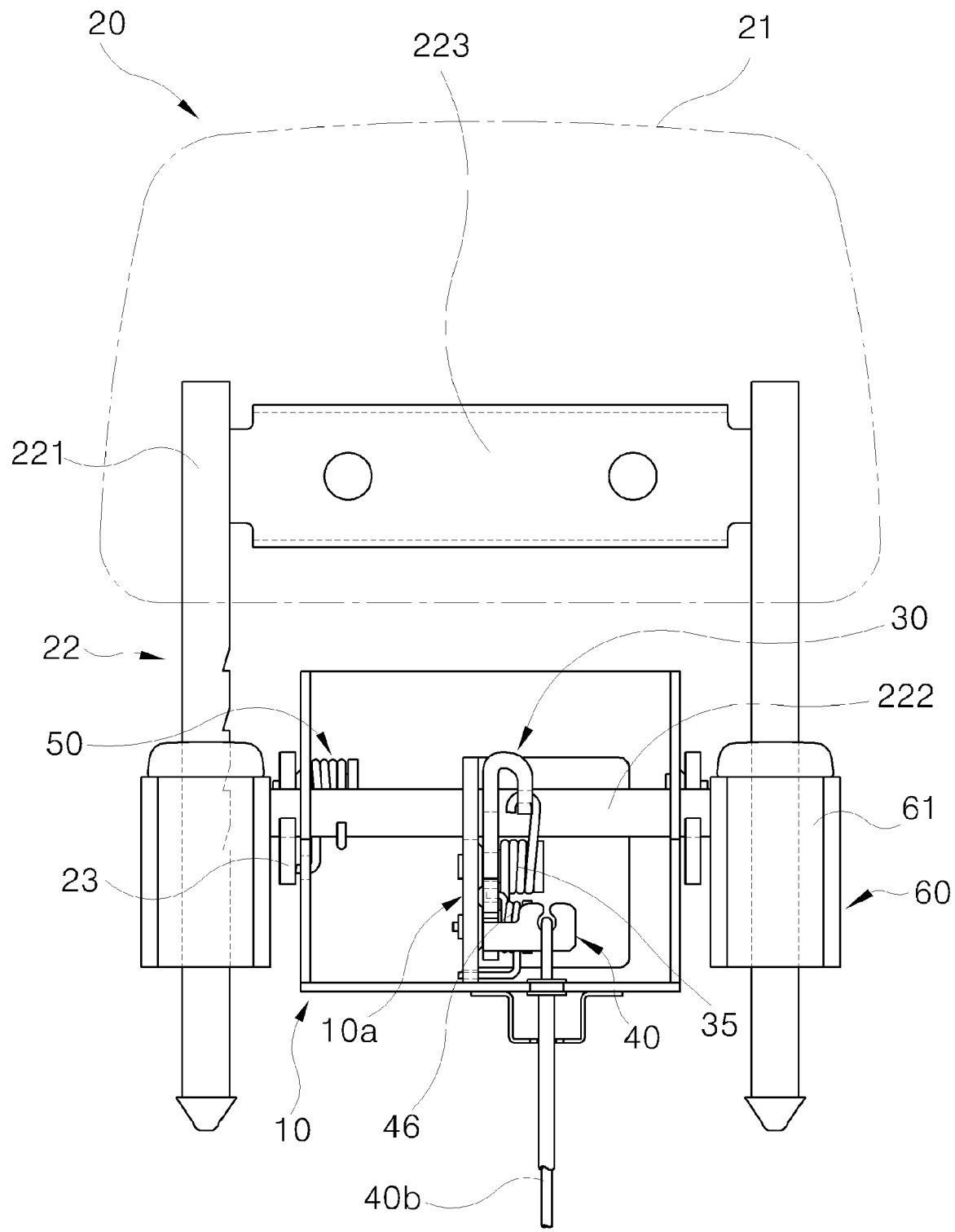
[Fig. 11]

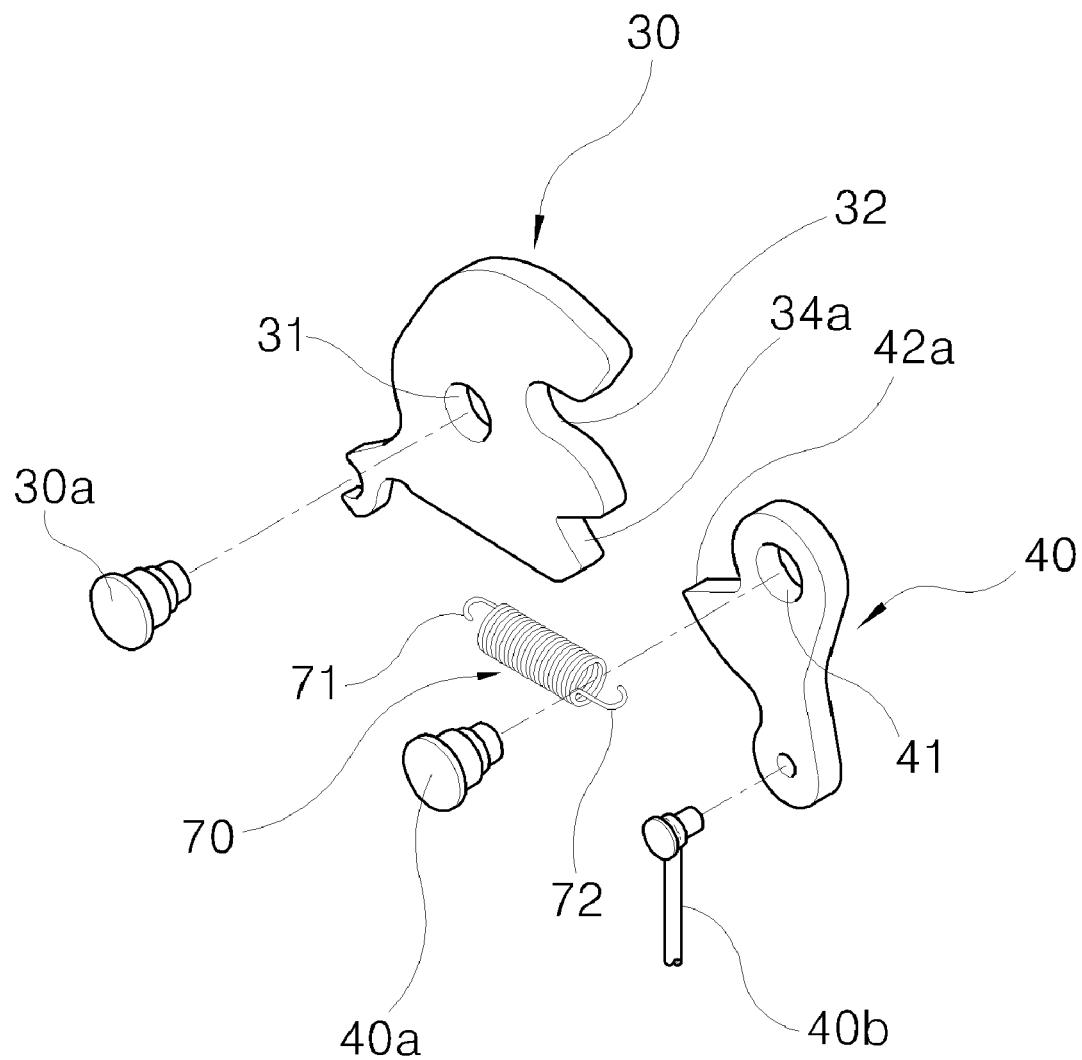
[Fig. 12]

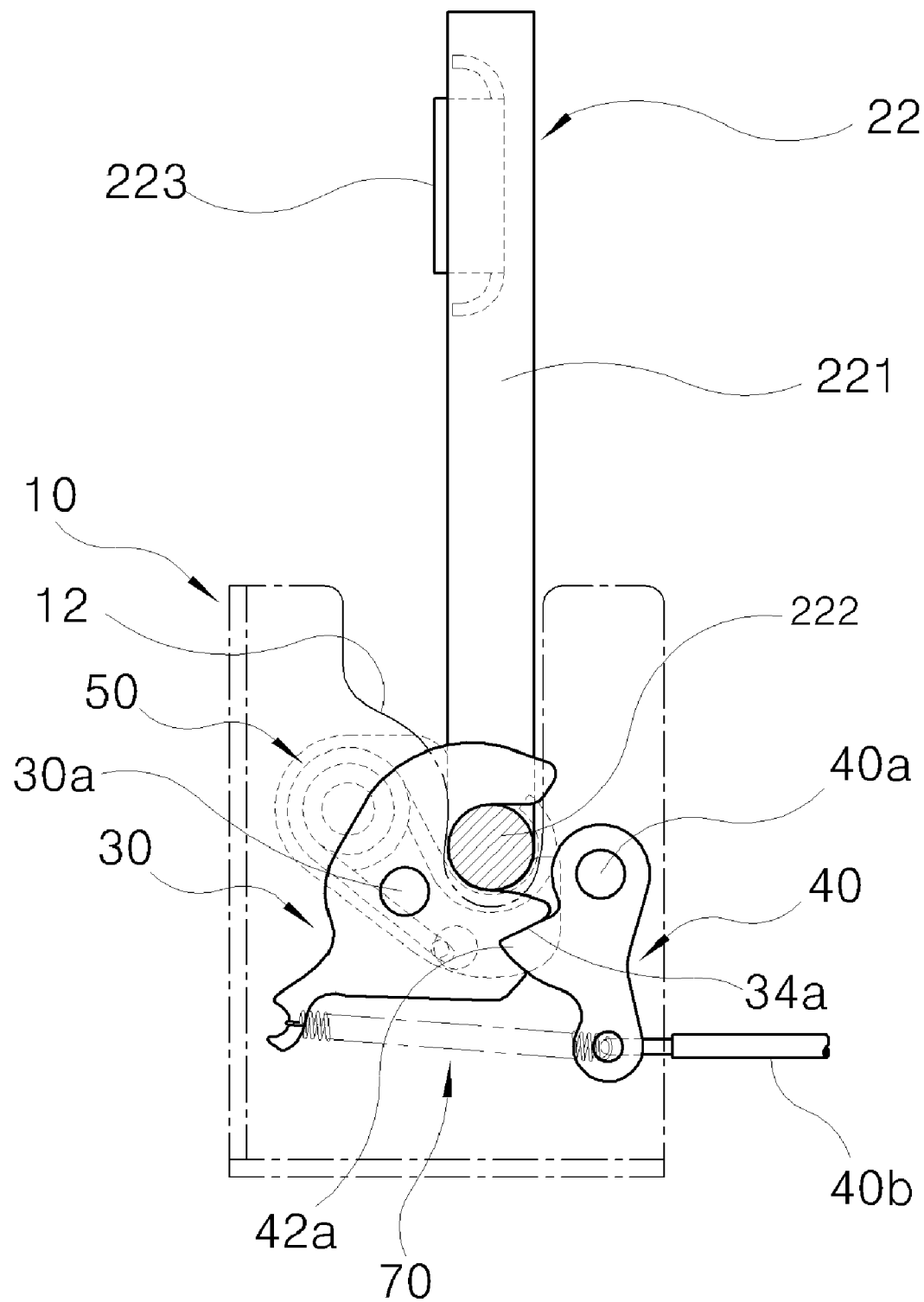
[Fig. 13]

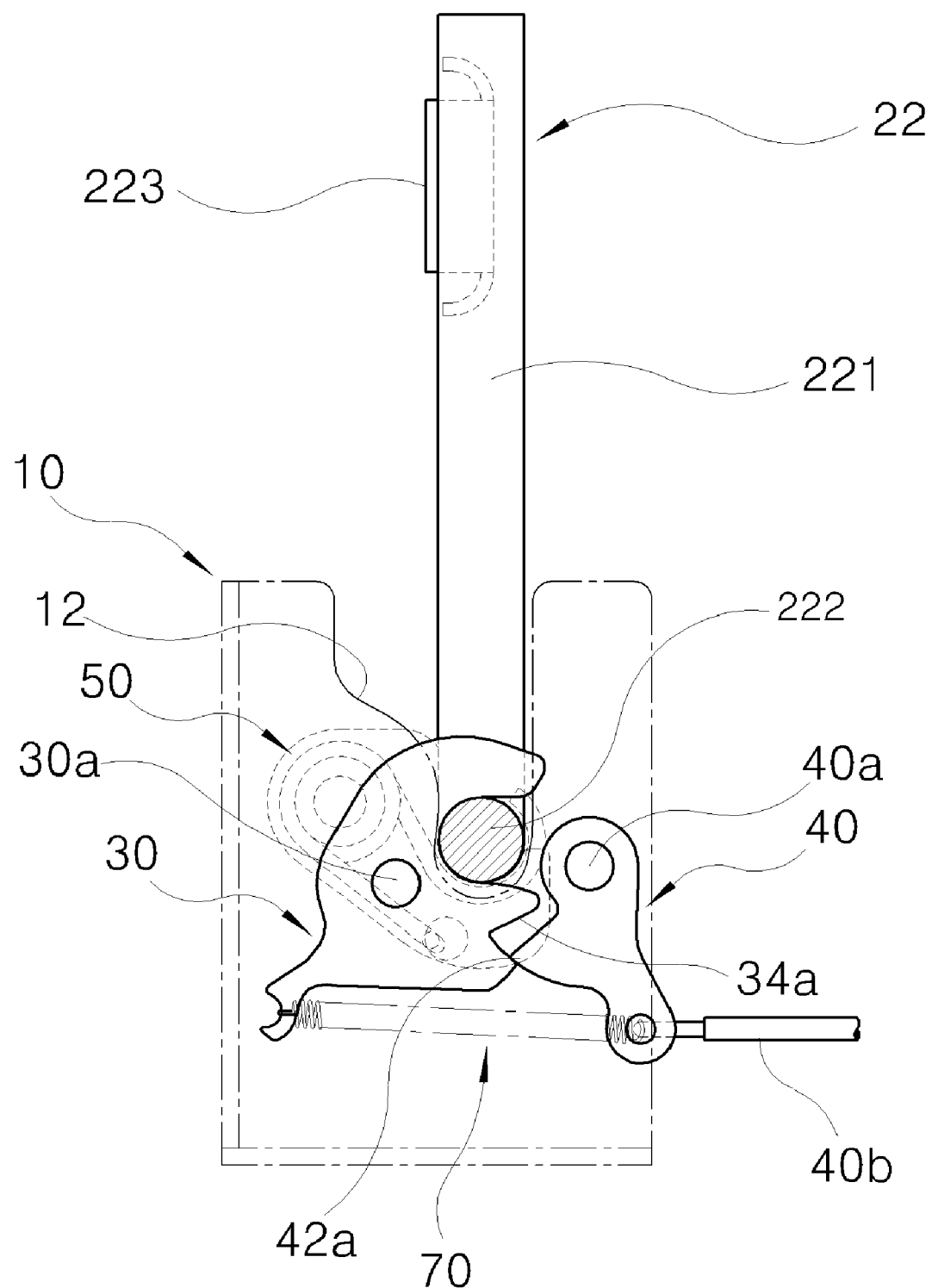
[Fig. 14]

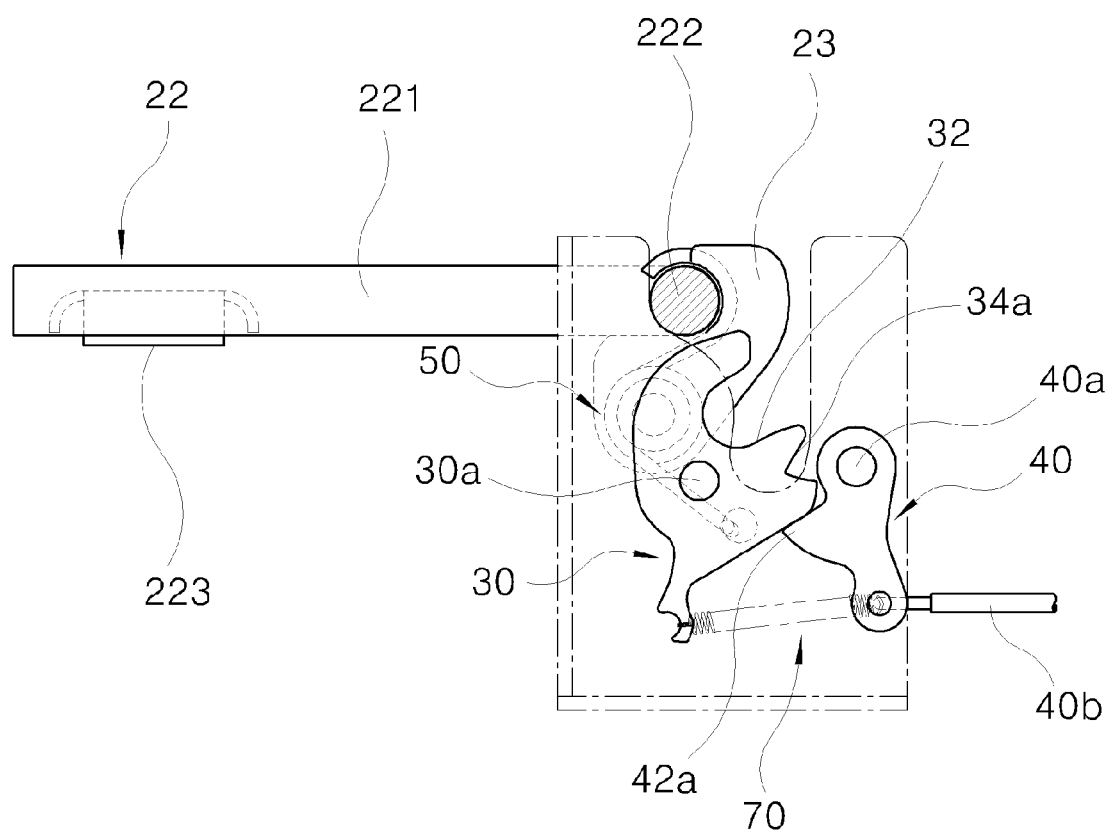
[Fig. 15]

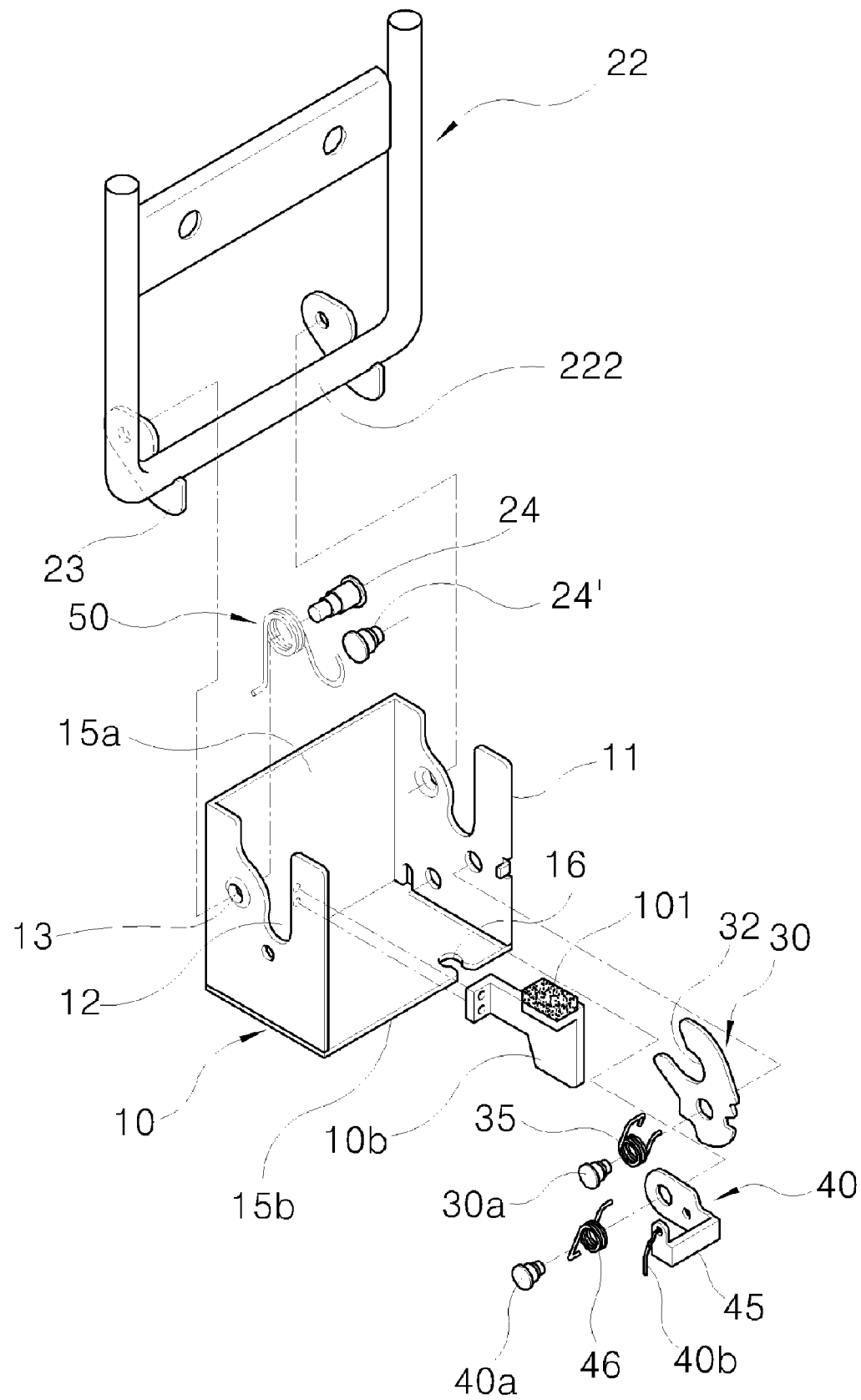
[Fig. 16]

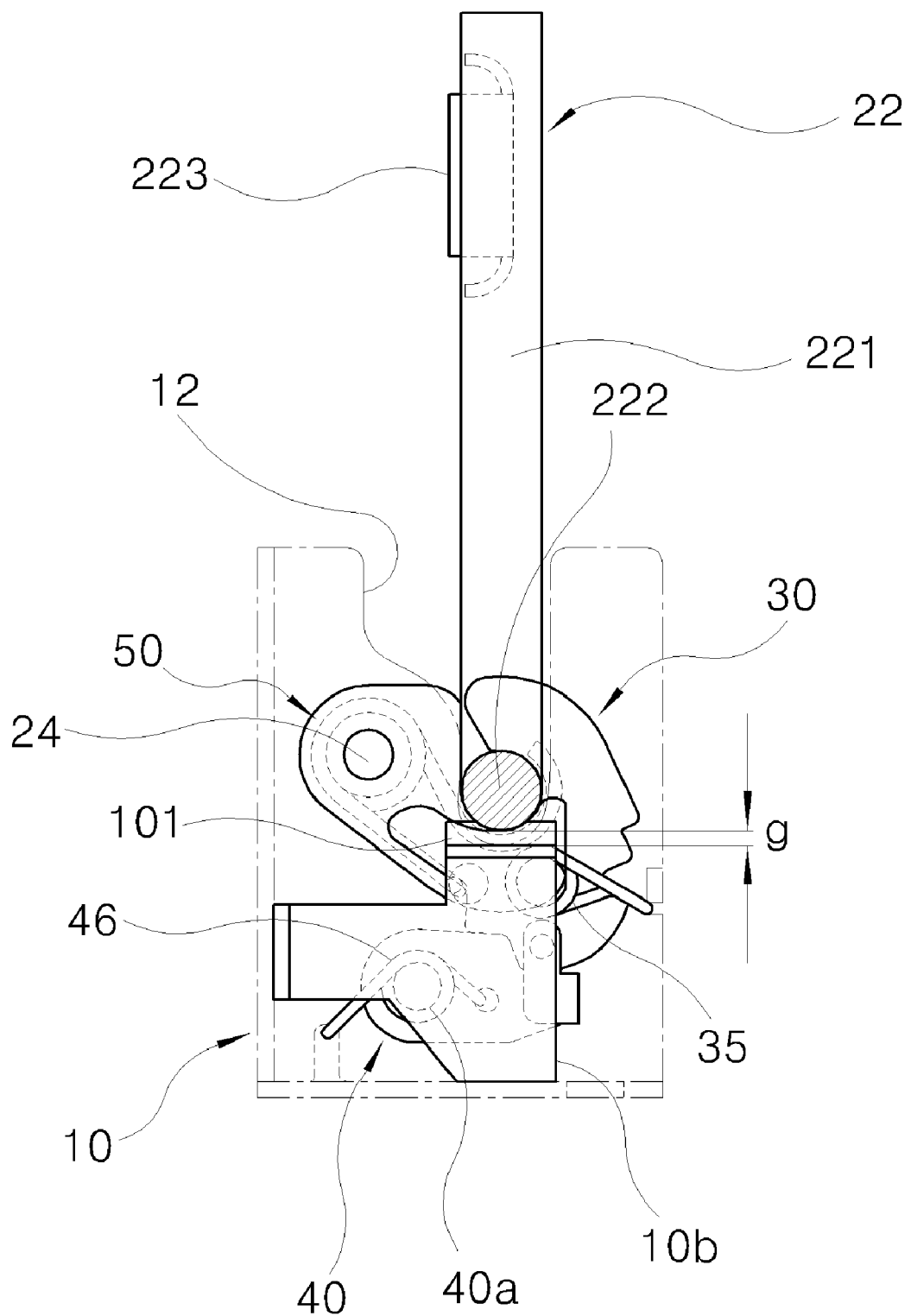
[Fig. 17]

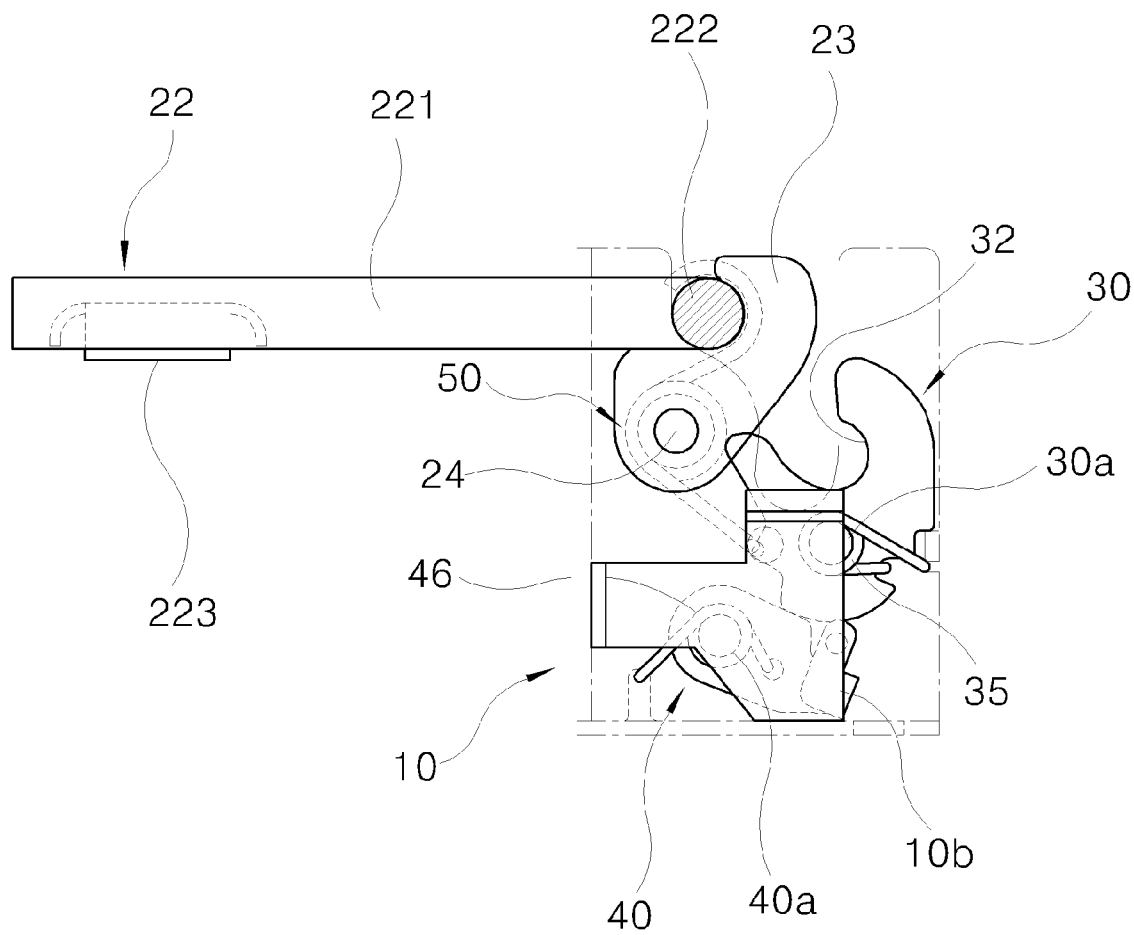
[Fig. 18]

DEVICE FOR STOOPING CAR HEADRESTS

TECHNICAL FIELD

The present invention relates to a device for stooping car headrests, and more particularly, to a device for making car headrests to stoop down on the backrest, which may be used together with a folding backrest to provide an extra space for loading cargoes in a vehicle.

BACKGROUND ART

Generally, a multi-seater van has three or four rows of seats, each of which allows three seats to sit thereon. To secure a space in which goods and the like may be loaded, a rear seat of a van is designed such that a backrest thereof may be folded down onto the seat cushion thereof or the whole seat may be temporarily detached from the floor of the car.

However, the narrow space of the van does not allow a backrest to be folded down on the seat cushion without being bumped against the back of the backrest of the front seat in many cases, requiring the headrest to be removed from the top of the backrest.

The headrest detached as such is likely to be carelessly placed in the vehicle and often left to be soiled, damaged or lost due to improper handling thereof.

In addition, there are problems of cumbersomeness and inconveniences that the headrest should be detached or attached, each time the backrest is folded down or returned to its upright position.

DISCLOSURE OF INVENTION

Technical Problem

The present invention is conceived to solve the aforementioned problems in the prior art. An object of the present invention is to provide a device for stooping a headrest on the backrest of a car seat, wherein the headrest is readily stooped down for providing an extra loading space without requiring the headrest to be removed from the original position for folding the backrest and thus the headrest can be prevented from being damaged or lost.

Technical Solution

For achieving the object, the present invention provides a device for stooping car headrests, comprising a housing wherein a stay of a car headrest pivotably coupled thereto; a main spring installed in the housing to bias the stay and the headrest in the forward direction; an arresting member rotatably and resiliently fixed to the housing to releasably hold the stay; and a check member having a release means and rotatably and resiliently coupled to the arresting member.

Advantageous Effects

With the device for stooping car headrests according to the present invention, a headrest mounted on the backrest of a rear seat may be stooped down on the backrest, when the backrest is to be folded down. Accordingly, the backrest of the rear seat can be folded down onto the seat cushion without the headrest being bumped against the back of the backrest of the front seat.

BRIEF DESCRIPTION OF THE DRAWINGS

The present invention will be described below in detail for preferred embodiments with reference to the accompanying drawings, in which:

FIG. 1 is a side view schematically showing examples of car seats to which a device for stooping car headrests according to the present invention is applied;

FIG. 2 is an exploded perspective view of a device for stooping car headrests according to a first embodiment of the present invention;

FIG. 3 is an enlarged, exploded perspective view of a housing of the device shown in FIG. 2;

FIG. 4 is an enlarged, exploded perspective view of an arresting member and a check member of the device shown in FIG. 2;

FIG. 5 is a rear view showing the assembled state of the device shown in FIG. 2;

FIGS. 6 to 9 are side views showing operating states of the device shown in FIG. 2;

FIGS. 10 and 11 are rear views of a device for stooping car headrests according to a modification of the first embodiment of the present invention;

FIG. 12 is an exploded perspective view of some essential parts of a device for stooping car headrests according to a second embodiment of the present invention;

FIGS. 13 to 15 are side views showing operation of the device shown in FIG. 12;

FIG. 16 is a perspective view of a device for stooping car headrests according to a third embodiment of the present invention; and FIGS. 17 and 18 are side views showing operation of the device shown in FIG. 16.

BEST MODE FOR CARRYING OUT THE INVENTION

According to an aspect of the present invention, there is provided a device for stooping car headrests wherein a stay comprises two vertical portions with upper portions thereof for attaching a head support member of the headrest thereto, a horizontal portion connecting lower ends of the vertical portions, and a pair of hinge pieces having respective shaft holes with rear ends thereof fixed apart on the front face of the horizontal portion; a housing is provided in the form of a box without a top and the rear wall and with a pair of side walls having a pair of opposite guide grooves with the narrower lower portion and the upwardly widening upper portion, which allow the horizontal portion of the stay to be received and pivoted therein, and a pair of hinge holes aligning with the corresponding shaft holes of the stay, and a front wall between the side walls having a bracket attached to the inner surface thereof and formed with a receiving groove aligning with the guide grooves; a main spring is hooked to the inner surface of one of the side walls of the housing with a shaft pin fixed in a hinge hole of the housing to apply a resilient force for pivoting the stay in the forward direction; an arresting member formed with a holding groove and a holding projection at the upper portion and the front lower portion thereof, respectively, is rotatably coupled to the bracket by a shaft pin so that the holding groove may align with the guide grooves, being biased by a holding spring exerting a resilient force in a direction opposite to that of the resilient force of the main spring; and a check member has first and second jaws formed at the upper and lower portions thereof to define a step therebetween so that the jaws may engage with the holding projection when the stay is in the upright state and the stooped state, respectively, and is fixed to the bracket with a shaft pin to be engaged with the arresting member, while one side of the check member is resiliently supported by a check spring exerting a resilient force in a direction opposite to that of the resilient force of the holding spring.

In the above device for stooping car headrests, the arresting member and the check member may be fixed with the shaft pins to the inner surface of either side wall rather than the bracket attached to the front wall.

According to another aspect of the present invention, there is provided a device for stooping car headrests, wherein a stay comprises two vertical portions with upper portions thereof for attaching a head support member of the headrest thereto, a horizontal portion connecting lower ends of the vertical portions, and a pair of hinge pieces having respective shaft holes with rear ends thereof fixed apart on the front face of the horizontal portion; a housing is provided in the form of a box without a top and the rear wall and with a pair of side walls having a pair of opposite guide grooves with the narrower lower portion and the wider upper portion, which allow the horizontal portion of the stay to be received and pivoted therein, and a pair of hinge holes aligning with the corresponding shaft holes of the stay, and a front wall between the side walls; a main spring is hooked to the inner surface of one of the side walls of the housing with a shaft pin fixed in a hinge hole of the stay to apply a resilient force for pivoting the stay in the forward direction; an arresting member with a holding groove and a locking recess formed adjacently at the upper and lower sides is fixed with a shaft pin to the inner surface of the other of the side walls so that the holding groove may align with the guide grooves; a check member formed with a jaw to be engaged with the locking recess of the arresting member is fixed by a shaft pin to the inner surface of the other of the side walls to face and be engaged with the arresting member; a coil spring is hooked between lower ends of the arresting member and the check member to resiliently support the arresting member and the check member.

In the above device for stooping car headrests, the arresting member and the check member may be fixed by the shaft pins to a bracket attached to the front wall rather than the inner surface of one of the side walls.

Mode for the Invention

Hereinafter, preferred embodiments of the device for stooping car headrests according to the present invention will be described in detail with reference to the accompanying drawings, in which;

FIG. 1 is a side view schematically showing examples of car seats to which a device for stooping car headrests according to the present invention is applied; FIG. 2 is an exploded perspective view of the device for stooping car headrests according to a first embodiment of the present invention; FIG. 3 is an enlarged perspective view of a housing of the device for stooping car headrests shown in FIG. 2; FIG. 4 is an enlarged perspective view of an arresting member and a check member of the device for stooping car headrests shown in FIG. 2; FIG. 5 is a rear view showing the device for stooping car headrests shown in FIG. 2; and FIGS. 6 to 9 are side views showing operation of the device for stooping car headrests shown in FIG. 2.

The device for stooping car headrests according to the first embodiment of the present invention comprises a housing 10 mounted on the upper portion of the rear plate fixed in the backrest 1*a* of a car seat 1; a stay 22 of the headrest 20 pivotably fixed to the housing; an arresting member 30 that is rotatably coupled to the upper portion of a bracket 10*a* attached to the inner surface of the front wall of the housing to receive a horizontal portion 222 of the stay 22 and has a holding spring 35; a check member 40 that is rotatably coupled to the lower portion of the bracket and has a check spring 46 exerting a resilient force in a direction opposite to that of the resilient force of the holding spring 35 to prevent the arresting member, which holds the horizontal portion of the stay 22, from being pivoted by the resilient force of the holding spring 35; and a main spring 50 resiliently installed on the stay 22 to exert a resilient force for pivoting the headrest in the forward direction.

The housing 10 is provided in the form of a box without a top and the rear wall. Two side walls 11 of the housing are formed with opposite guide grooves 12 with the upper portion widening upwardly. Hinge holes 13 are formed in front of the lower portions of the guide grooves, respectively. A hanging hole 14 is formed under the guide groove 12 in one of the side walls, and an opening 16 is formed at the rear end of the bottom portion 15*b*.

The bracket 10*a* is attached to the front wall 15*a* of the housing to vertically traverse the middle portion thereof. A receiving groove 17 is formed at the upper intermediate portion of the bracket to align with the guide grooves 12. Fixing holes 18 and 18' and a hanging hole 19 are formed under the receiving groove in the bracket and a hanging recess 19' is formed at the front portion of the lower end of the bracket.

Each of the guide grooves 12 is formed such that the upper portion thereof has a width larger than that of the lower portion thereof with the upwardly widening section above the hinge hole 13. To this end, the rear end 121 of the guide groove is formed vertically, while the distance L between the upper front end 122 and the upper rear end is wider than that L' between lower portions thereof formed to be suited to the diameter of the horizontal portion of the stay 22. The upper and lower portions of the front end are connected by a curved intermediate portion r.

As will be described hereinafter, this leads to cause the horizontal portion 222 of the stay 22 to be caught by the upper portions of the front ends 122 of the guide grooves when the headrest 20 is pivoted from the vertical state to the horizontal state, i.e., the headrest is stooped by 90 degrees, thereby preventing the horizontal portion 222 of the stay 22 from being further pivoted.

The headrest 20 comprises a head support member 21 filled with an expandable material and the stay 22 with vertical portions 221 of which upper ends have the head support member attached thereon and the lower horizontal portion 222 pivotably coupled to the housing 10. The upper ends of the vertical portions 221 extend out of the top of the backrest 1*a* and are exposed thereabove. A fixing plate 223 of the head support member 21 is fixedly attached across the upper parts of the vertical portions, as known in the art.

Hinge pieces 23 with shaft holes 231 are fixedly attached at opposite sides of the horizontal portion 222. The shaft holes align with the hinge holes 13 outside the side walls 11 to receive hinge pins 24 and 24'.

Therefore, the stay 22 is fixed in the housing 10 to pivot on the hinge pins 24 and 24' fixed into the shaft holes 231 of the hinge pieces 23 and the hinge holes 13 of the housing 10. When the stay is in the upright position, the horizontal portion 222 thereof is received and positioned in the lower portions of the guide grooves 12 and the receiving groove 17.

In this state, the horizontal portion 222 is lifted to leave the lower portions of the guide grooves 12 and the receiving groove 17, when the headrest 20 is pivoted on the pins 24 and 24' forward, i.e., counter clockwise in FIG. 2. When the horizontal portion is brought into contact with and caught by the upper portions of the front ends 122, it cannot be further pivoted and thus the headrest is positioned and maintained in the horizontal state.

Meanwhile, the main spring 50 is wound around the hinge pin 24 fixed in the hole 13 of one of the side walls 11. A curved end 51 of the main spring is hooked on the horizontal portion 222 of the stay and the other end 52 thereof is fixed in the hanging hole 14 formed in one of the side walls 11 of the housing 10.

Accordingly, the resilient force of the main spring 50 is exerted on the horizontal portion 222 so as to cause the stay 22 to pivot on the hinge pin 24 forward, i.e., counterclockwise in FIG. 2. Thus, the headrest 20 can be stooped from the vertical state to the horizontal state.

The arresting member 30 having a shaft hole 31 at the center thereof is provided with a holding groove 32 to be aligned with the receiving groove 17 of the bracket 10a.

One of the two end portions forming the groove 32 is bent twice, outwardly and inwardly, to form a hanging piece 33 provided with a hanging hole, making the member to have the "U" shape, while a holding projection 34 is formed at the front lower part of the arresting member.

The arresting member 30 is rotatably coupled to the bracket by a holding shaft 30a of which an end is inserted into the shaft hole 31 and fixedly coupled in the fixing hole 18 of the bracket 10a.

The holding spring 35 is wound around the holding shaft 30a with one end 351 thereof inserted in the hanging hole formed at the hanging piece 33 and the other end thereof hooked in the hanging hole 19 of the bracket 10a.

With such a configuration, the resilient force of the holding spring 35 is exerted to bias the arresting member 30 rearward of the headrest 20, i.e., clockwise in FIG. 2. However, the headrest is maintained in the vertical state, as the holding spring is in the compressed state and the horizontal portion 222 of the stay 22 is still arrested in the slanted holding groove of the arresting member and the receiving groove 17 of the bracket 10a. When the repulsive force of the holding spring is exerted to rotate the arresting member clockwise, the holding groove will turn upright from the slanted state, helping the horizontal portion of the stay come out of the guide grooves 12 and the receiving groove 17 in cooperation with the main spring.

The check member 40 is made of a plate and rotatably fixed to the inner surface of the bracket 10a so as to be placed below the arresting member 30 with a shaft 40a of which the front end is fixedly engaged with the fixing hole 18 after being inserted through the shaft hole 41 formed at the front end of the check member.

A first jaw 42 for engaging with the holding projection 34 of the arresting member 30 is formed at the rear end of the upper surface of the check member, and a second jaw 43 is formed in front of the first jaw to form a step together with the first jaw. The check member 40 is further provided with a banding piece 45 at the rear end thereof so that one end of a wire 40b serving as a release control means by pulling down and rotating the check member 40 clockwise is fixed to the banding piece. The check member is also formed with a hanging hole 44 in the vicinity of the second jaw. The release wire 40b passes through the opening 16 formed in the bottom portion 15b of the housing 10 and the distal end thereof is connected to a lever (not shown) that may be provided at one side surface of the backrest to be used for releasing the backrest 1a from the fixed state with the seat cushion and folding the backrest 1a down onto the seat cushion.

When the lever is operated, the fixed state of the backrest with the seat cushion is released and the release wire 40b is also pulled down so that the check member 40 is rotated clockwise.

The time required for the clockwise rotation of the check member 40 is determined to such an extent that the holding projection 34 may be disengaged from the first jaw 42 and then caught by the second jaw 43. When the holding projection is caught by the second jaw, the arresting member is prevented from further rotation.

That is, the rotation of the arresting member 30 is stopped at the position where the holding projection 34 is caught by either of the first and second jaws 42, 43.

The check spring 46 is in the compressed state of being fitted around the shaft 40a, and one end 461 thereof is hung in the hanging hole 44 and the other end 462 thereof is hooked in the hanging recess 19' of the bracket 10a.

With such a configuration, the repulsive force of the compressed check spring 46 is exerted on the check member 40 in a direction opposite to that of the resilient force exerting on the arresting member 30. However, since the check member and the arresting member are prevented from being rotated counterclockwise and clockwise, respectively, in the state where the holding projection 34 of the arresting member is caught by the first jaw 42, the stay 22 is maintained in the upright state together with the headrest as shown in FIG. 6.

When the release wire 40b is pulled down and the check member 40 is rotated clockwise, the arresting member 30 is subsequently rotated clockwise by means of the cooperation of the second jaw 42 and the holding projection 34. The holding groove 32 of the arresting member, which has been positioned slantly with respect to the receiving groove 17 of the bracket 10a to prevent the horizontal portion 222 of the stay 22 from being lifted, is turned upright and thus made to align with the receiving groove 17, thereby releasing the horizontal portion of the stay 22 from the arrested state. With the action of the repulsive force of the compressed main spring 50 and the pushing action of the arresting member, the stay 22 and the headrest 20 coupled thereto are pivoted counterclockwise on the pin 24 so that the horizontal portion of the stay may be lifted from the receiving groove and the holding groove (see FIGS. 7 and 8).

The stay 22 and the headrest 20 are further pivoted by means of the resilient force of the main spring 50 to the position as shown in FIG. 9. Thus, the headrest is stooped from the vertical state to the horizontal state.

Pivoting of the headrest 20 is stopped in the horizontally stooped state, because the horizontal portion 222 of the stay 22 is confined by the upper portions of the front ends 122 of the guide grooves 12 formed in the both side walls 11. Since the holding projection 34 is caught by the second jaw 43, rotation of the arresting member 30 and the check member 40 is also stopped.

Time required for stooping the headrest 20 from the upright state to the horizontal state should be considerably short, i.e., the stooping of the headrest should be achieved before the headrest reaches the upper end of the backrest of the front seat. The backrest can be folded down onto the seat cushion 1b without being hindered by the headrest, since the headrest has been already stooped forward on the backrest 1a.

Meanwhile, the headrest 20 remains in the horizontally stooped state on the top of the backrest and shall be set up manually, after the folded backrest 1a is returned to the upright position.

When the stay 22 is pushed up for clockwise pivoting on the hinge pin 24, the main spring 50 is compressed and the horizontal portion 222 enters into the receiving groove 17, pushing the holding groove 32 downward. Accordingly, the arresting member 30 is rotated counterclockwise and the holding spring 35 is also compressed.

This operation is kept until the lower portion of the holding groove 32 is made to align with the receiving groove 17. Upon completion of the alignment of the holding groove with the receiving groove, the arresting member 30 is prevented from being rotated counterclockwise and the middle section of the horizontal portion is positioned within the receiving groove 17 and the holding groove 32 that is slightly slanted with respect thereto and both side sections of the horizontal portion are positioned within the narrow lower portions of the guide grooves 12.

Meanwhile, the holding projection 34 is separated from the second jaw 43 of the check member 40, when the arresting member 30 is rotated counterclockwise. The check member is then rotated counterclockwise by means of the resilient force of the check spring 46 that has been compressed due to the clockwise rotation of the check member by the wire 40b pulled down.

The counterclockwise rotation of the check member 40 and the arresting member 30 is continued until the holding projection 34 is caught by the first jaw 42, resulting in firm engagement of the check member 40 and the arresting member 30. Thus, the members cannot be further rotated counterclockwise and the vertical portions of the stay 22 is returned to and maintained in the upright position as shown in FIG. 6.

The headrest 20 is kept in the upright position together with the stay 22, because the holding projection 34 of the arresting member 30 is caught by the first jaw 42 of the check member 40 which is biased to rotate by the resilient force of the check spring 46 in the direction opposite to that of the rotation of the arresting member. If the projection and the jaw are not released from such engagement, the headrest remains in the upright position, even though the resilient force of the main spring 50 is larger than that of the holding spring 35.

In other words, the pivoting of the headrest is prevented by the check member 40 engaged with the arresting member 30, even though the headrest 20 is forced to pivot counterclockwise by means of the repulsive force of the main spring 50. Thus, the headrest is fixed not to pivot, as far as the state where the arresting member 30 is held by the check member 40.

In the device for stooping car headrests according to the first embodiment of the present invention, the arresting member and the check member are rotatably coupled to the bracket 10a. However, as an alternative thereof, they may be attached to one of the two side walls of the housing with the bracket 10a eliminated (refer to a third embodiment to be described hereinafter).

FIGS. 10 and 11 are rear views of a device for stooping car headrests according to a modification of the first embodiment of the present invention.

This modification is characterized in that the head support member 21 of the headrest 20 may be lowered and raised by the modified structure of the stay 22 of the first embodiment, the vertical portions 221 and the lower horizontal portion 222 of which are formed as a single body.

The stay 22 of this example has the vertical portions 221 and the lower horizontal portion 222, which are formed separately from each other. Lower ends of the vertical portions are coupled to the corresponding sleeve housings 61 vertically mounted on housing cases 60 installed at the upper end of the backrest 1a. Both ends of the horizontal portion are fixed to outer surfaces of the housing cases by means of welding.

Since the stay 22 is coupled to the sleeve housings 61 such that it may be vertically lifted or lowered, the height of the headrest 20 can be adjusted.

FIG. 12 is an exploded perspective view of some essential parts of a device for stooping car headrests according to a second embodiment of the present invention; and FIGS. 13 to 15 are side views of the device in different operating states.

The basic structure of the device for stooping car headrests according to the second embodiment is substantially the same to that of the first embodiment, except that the arresting member and the check member are arranged to cooperate with each other by means of a single coil spring 70, differently from the structure of the first embodiment in which the arresting member 30 is arranged to be rotated clockwise by means of the resilient force of the holding spring 35 and the check member 40 is disposed to be rotated counterclockwise by means of the resilient force of the check spring 46 so that the two members may be sequentially operated by means of those springs.

As the arresting member and the check member are arranged to operate by means of the single coil spring 70, there are advantages in that the number of springs and assembling steps of the device are reduced and the arresting member 30 and the check member 40 may be operated like a unitary body.

The arresting member 30 and the check member 40 are arranged to face each other rather than one above another as in the first embodiment. The arresting member 30 is coupled to a bracket 10a through a shaft hole 31 at the center of the arresting member by a shaft 30a. The check member is rotatably fixed to the bracket 10a through a shaft hole 41 at the upper end of the check member by a shaft 40a. At the same time, one end 71 and the other end 72 of the coil spring 70 are hooked on lower ends of the arresting member and the check member, respectively.

With such a configuration, the lower ends of the arresting member 30 and the check member 40 are pulled toward each other by the resilient force of the coil spring 70. Thus, the resilient force of the coil spring is exerted to rotate the arresting member and the check member counterclockwise and clockwise, respectively.

A holding groove 32 is formed to open upward when the arresting member 30 is rotated counterclockwise, and a locking recess 34a is formed below the holding groove. A jaw 42a is formed to protrude from the front intermediate portion of the check member 40 so as to be caught in the locking recess.

One end of a release wire 40b for pulling and rotating the check member counterclockwise is fixed to the lower end of the check member 40. The wire and components associated therewith and the operation thereof are the same as those of the first embodiment.

In the device for stooping car headrests according to the second embodiment constructed as above, the lower horizontal portion 222 of the stay 22 may be pivoted clockwise on the hinge pin 24 and lowered into the narrow lower portions of the guide grooves 12, pushing down the bottom surface of the holding groove 32, when the headrest 20 in the state stooped over the backrest is pushed up to the upright position. Accordingly, the arresting member 30 is rotated clockwise and thus the holding groove 32 is placed perpendicular to the lower portions of the guide grooves, in which the horizontal portion is placed. Then, the jaw 42a of the check member 40 is forced to enter and engage with the locking recess 34a by the resilient force of the coil spring 70 so that rotation of the arresting member and the check member may be stopped, making the headrest kept in the upright state. The main spring 50 is resultantly compressed to have an increased repulsive force due to the clockwise pivoting of the stay 22.

In this state, the counterclockwise pivoting action of the stay is blocked by the engagement of the arresting member 30 and the check member 40, because such engagement blocks the repulsive force of the compressed main spring 50 from being exerted on the horizontal portion 222 to pivot the stay 22 counterclockwise. Thus, the horizontal portion of the stay cannot come out from the holding groove 32 and the headrest 20 is kept stationary in the upright position (see FIG. 13), as far as the two members are engeged with each other as above.

The check member is rotated counterclockwise and the jaw 42a is made to be disengaged from the locking recess 34a, making the arresting member 30 released from the engagement with the check member, when the release wire 40b and the lower end of the check member 40 are pulled laterally. The repulsive force of the coil spring 70, which has been extended as the check member is rotated counterclockwise, is exerted to pull the lower end of the arresting member so that the arresting member may be rotated counterclockwise with the holding groove 32 thereof turned upwardly (see FIG. 14).

With the holding groove 32 turned upwardly as such, the horizontal portion 222 is released from the arrested state so that the resilient force of the compressed main spring 50 is applied to pivot the stay 22 counterclockwise. Accordingly, the horizontal portion comes out from the holding groove, and at the same time, the headrest 20 is forced to be stooped to the horizontal state as shown in FIG. 15 so that the backrest of the seat may be folded down onto the seat cushion without being hindered by the headrest.

On the other hand, the backrest 1a is manually returned to the upright position from the folded position with the stooped headrest 20, which also need to be manually unfolded. When the headrest is manually unfolded upwardly, the stay 22 is pivoted clockwise on the hinge pin 24, making the main spring 50 compressed and pushing the bottom surface of the holding groove 32 downward so that the horizontal portion 222 may be lowered for entering the holding groove and the guide grooves 12.

The arresting member 30 is thus rotated clockwise, making the lower jaw thereof under the holding groove to travel along and push down the jaw 42a so that the check member 40 may be rotated counterclockwise. As soon as the lower jaw has passed over the front end of the jaw of the check member, the resilient force of the coil spring 70 that has been extended due to rotations of the arresting member and the check member in the opposite directions is applied to force the check member to be pivoted clockwise and the jaw 42a to enter and engage with the locking recess 34a of the arresting member so that the arresting member and the check member are not further pivoted. Thereafter, the headrest 20 is kept stationary in the vertical state together with the stay 22 as shown in FIG. 13.

The arresting member 30 and the check member 40 operating as described above may be coupled to the bracket 10a attached to the front wall 15a of the housing in the first embodiment, or directly to the inner surface of one of the side walls 11 of the housing 10 without the bracket 10a used (see a third embodiment to be described hereinafter).

FIG. 16 is a perspective view of a device for stooping car headrests according to a third embodiment of the present invention, while FIGS. 17 and 18 are side views showing operation of the device for stooping car headrests shown in FIG. 16.

The third embodiment of the present invention is characterized in that the arresting member 30 for holding the horizontal portion 222 of the stay 22 therein and the check member 40 for releasably preventing the arresting member from being rotated are coupled to the inner surface of one of the side walls 11 of the housing 10 and a rocking-prevention bracket 10b is provided on the inner surface of the front wall 15a of the housing.

The reason for providing the rocking-prevention bracket 10b will be described below.

In the devices for stooping car headrests according to the first and second embodiments, the stay 22 of the headrest 20 is axially arranged on the hinge pins 24, 24' inserted in the hinge holes 13 and the shaft holes of the hinge pieces 23 so as to be pivoted in a range of about 90 degrees between the vertical and horizontal states. Therefore, the horizontal portion 222 of the stay placed in the upper portions of the guide grooves 12 formed in the both side walls 11 of the housing 10 is forced to enter and stay at the narrow lower portions thereof, when the stay 22 is pivoted on the hinge pins to have the headrest in the upright position. The horizontal portion of the stay is forced to come out from the guide grooves for placing the headrest in the stooped state. The varying width of the upper portions of the guide grooves and the depth of the lower portions of the same are desirably formed to conform to the path of the horizontal portion pivoting on the hinge pins fixed in the shaft holes of the hinge pieces. However, even a slight offset in attaching the hinge pieces to the stay or aligning the shaft holes of the hinge pieces with the hinge holes may make it hard for the horizontal portion to be properly lowered on the narrow lower portions of the guide grooves. To solve this problem, the lower portions of the guide grooves are generally formed to have a width wider than the diameter of the horizontal portion of the stay and a depth deeper than one normally required. With the above configuration, however, the horizontal portion of the stay may not reach the bottom of the guide grooves, leaving a gap g therebetween, in the case that there is not an offset associated with the hinge pieces as above and thus the stay may rock above the bottom of the guide grooves. This requires the device to be provided with a rocking-prevention means.

The rocking-prevention bracket 10b of this embodiment is arranged so that the top surface thereof is positioned on the same height as or slightly below the bottom of the guide grooves 12. In addition, an elastic member 101 with an appropriate thickness, which is formed of elastic materials such as rubber, synthetic rubber, a spring or the like, is provided on the top surface of the rocking-prevention bracket in consideration of the gap between the bottom of each guide groove and the position where the horizontal portion 222 of the stay 22 shall be stopped after having normally entered the guide groove. When the lowering horizontal portion approaches the bottom of the guide groove, pressing the elastic member, a resilient force of the elastic member serves to support the horizontal portion, thereby preventing it from rocking even though there is a gap g between the bottom of the guide groove and the horizontal portion.

Meanwhile, the arresting members and the check members in the first and second embodiments can be used as the arresting member 30 and the check member 40 in the third embodiment. The location of the opening 16 formed in the bottom portion 15b of the housing 10 so that the release wire 40b connected to the banding piece 45 of the check member passes therethrough may differ from those in the first and second embodiments.

Although the present invention has been described in connection with the preferred embodiments in which the headrest is pivoted in a range of about 90 degrees between the vertical and horizontal states, the pivoting angle may vary by changing the engagement state of the arresting member and the check member with each other.

Further, although the control means has been described by way of example as a release wire which may be connected to a lever for folding the seat, the release wire may be provided to be exposed at a side or bottom surface of a seat, or replaced with a release lever.

Although the present invention has been described by way of example in connection with the preferred embodiments, the scope of the present invention is not limited thereto but may be limited only by the appended claims.

INDUSTRIAL APPLICABILITY

The device for stooping car headrests according to the present invention is very much convenient to use, since the headrest is easily stooped and thus not caught by the upper end of the backrest of the front seat in a vehicle, when the backrest of a car seat is to be folded down onto the seat cushion, thereby allowing the seat to be easily folded down without being hindered by the headrest thereof.

Further, the device for stooping car headrests according to the present invention can prevent the headrest from being lost, stained or damaged, because the detachment of the entire seat or the headrest is not needed for folding down the backrest of a car seat.

In addition, the device for stooping car headrests according to the present invention can be conveniently used without the problem of the headrest rocking.

The invention claimed is:

1. A device for stooping car headrests, comprising:
   a housing (10) having a stay (22) of a headrest (20) pivotably arranged therein;
   a main spring (50) provided in said housing (10) to bias said stay (22) in a forward direction;
   an arresting member (30) resiliently biased by a holding spring (35) and rotatably fixed to said housing (10) to releasably hold said stay (22); and
   a check member (40) resiliently biased by a check spring (46) and rotatably engaged with said arresting member (30) for controlling operation of said arresting member (30) and having a release means.

2. A device for stooping car headrests, comprising:
   a housing (10) having a stay (22) of a headrest (20) pivotably arranged therein;
   a main spring (50) provided in said housing (10) to bias said stay (22) in a forward direction;
   an arresting member (30) resiliently and rotatably fixed to said housing (10) to releasably hold said stay (20); and
   a check member (40) resiliently and rotatably engaged with said arresting member (30) for controlling operation of said arresting member (30) and having a release means, wherein
   said stay (22) comprises parallel vertical portions (221) with a head support member (21) of the headrest (20) attached to upper portions thereof, a horizontal portion (222) connecting lower ends of said vertical portions, and a pair of hinge pieces (23) having respective shaft holes (231) and fixed apart to a front face of said horizontal portion (222);
   said housing (10) is in the form of a box without a top and a rear wall and with two side walls (11) having a pair of opposite guide grooves (12) with a wide upper portion and a narrow lower portion and hinge holes (13) to be aligned with said shaft holes (231) of said stay (22), and a front wall (15b) between said side walls (11) with a bracket (10a) attached to an inner surface of said front wall, said horizontal portion (222) of said stay (22) being accommodated and pivoted in said guide grooves and said bracket having a receiving groove (17) to be aligned with lower portions of said guide grooves (12);
   said main spring (50) is hooked in said housing (10) using one of said hinge holes (13) of said housing (10) to apply a resilient force for pivoting and stooping said stay (22) forward;
   said arresting member (30) has a holding groove (32) and a holding projection (34) at an upper portion and a lower portion thereof respectively and is rotatably attached to said bracket (l0a) so that said holding groove (32) may be aligned with said guide grooves (12), while being resiliently supported by a holding spring (35) exerting a resilient force in a direction opposite to that of the resilient force of said main spring (50); and
   said check member (40) has a first jaw (42) and a second jaw (43) formed one after another to define a step therebetween so that either one may engage with said holding projection (34) when said stay (22) is in an upright or stooped state, said check member being rotatably attached to said bracket (10a) to be engaged with said arresting member (30), while said check member is resiliently supported by a check spring (46) exerting a resilient force in a direction opposite to that of the resilient force of said holding spring (35).

3. The device as claimed in claim 2, wherein said stay (22) comprises parallel vertical portions (221) and a lower horizontal portion (222) formed as a unitary body.

4. A device for stooping car headrests, comprising:
   a housing (10) having a stay (22) of a headrest (20) pivotably arranged therein;
   a main spring (50) provided in said housing (10) to bias said stay (22) in a forward direction;
   an arresting member (30) resiliently and rotatably fixed to said housing (10) to releasably hold said stay (22); and
   a check member (40) resiliently and rotatably engaged with said arresting member (30) for controlling operation of said arresting member (30) and having a release means, wherein
   said stay (22) comprises parallel vertical portions (221) with a head support member (21) of the headrest (20) attached to upper portions thereof, a horizontal portion (222) connecting lower ends of said vertical portions, and a pair of hinge pieces (23) having respective shaft holes (231) and fixed apart to a front face of said horizontal portion (222);
   said housing (10) is in the form of a box without a top and a rear wall and with two side walls (11) having a pair of opposite guide grooves (12) with a wide upper portion and a narrow lower portion and hinge holes (13) to be aligned with said shaft holes (231) of said stay (221) and a front wall (15b) between said side walls (11), said horizontal portion (222) of said stay (22) being accommodated and pivoted in said guide grooves;
   said main spring (50) is hooked in said housing (10) using one of said hinge holes (13) of said housing to apply a resilient force for pivoting and stooping said stay (22) forward;
   said arresting member (30) has a holding groove (32) and a holding projection (34) at an upper portion and a lower portion thereof respectively and is rotatably attached to an inner surface of one of said side walls (11) so that said holding groove (32) may be aligned with said guide grooves (12), while being resiliently supported by a holding spring (35) exerting a resilient force in a direction opposite to that of the resilient force of said main spring (50); and
   said check member (40) has a first jaw (42) and a second jaw (43) formed one after another to define a step therebetween so that either one may engage with said holding projection (34) when said stay (22) is in an upright or stooped state, said check member being rotatably attached to the inner surface of one of the side walls to be engaged with said arresting member (30), while said check member is resiliently supported by a check spring (46) exerting a resilient force in a direction opposite to that of the resilient force of said holding spring (35).

5. The device as claimed in claim 4, wherein a rocking-prevention bracket (10b) is provided on an inner surface of said front wall (15a) of the housing (10) to support said horizontal portion (222) of the stay (22) when the headrest (20) is in an upright state.

6. The device as claimed in claim 5, wherein an elastic member (101) is provided on a top of said rocking-prevention bracket (10b).

7. The device as claimed in claim 6, wherein said elastic member (101) is made of one selected from the group consisting of rubber, synthetic rubber and a spring.

8. The device as claimed in claim 4, wherein said stay (22) comprises parallel vertical portions (221) and a lower horizontal portion (222) formed as a unitary body.

9. The device as claimed in claim 1, wherein
said stay (22) comprises parallel vertical portions (221) with a head support member (21) of the headrest (20) attached to upper portions thereof, a horizontal portion (222) connecting lower ends of said vertical portions, and a pair of hinge pieces (23) having respective shaft holes (231) and fixed apart to a front face of said horizontal portion (222);
said housing (10) is in the form of a box without a top and a rear wall and with two side walls (11) having a pair of opposite guide grooves (12) with a wide upper portion and a narrow lower portion and hinge holes (13) to be aligned with said shaft holes (231) of said stay (221, and a front wall (15b) between said side walls (11) with a bracket (10a) attached to an inner surface of said front wall, said horizontal portion (222) of said stay (22) being accommodated and pivoted in said guide grooves and said bracket having a receiving groove (17) to be aligned with lower portions of said guide grooves (12);
said main spring (50) is hooked in said housing (10) using one of said hinge holes (13) of said housing (10) to apply a resilient force for pivoting and stooping said stay (22) forward;
said arresting member (30) has a holding groove (32) at an upper portion thereof and a locking recess (34a) at a lower portion thereof and is rotatably attached to said bracket (10a) so that said holding groove (32) is aligned with said receiving groove (17);
said check member (40) has a jaw (42a) to be engaged with said locking recess (34a) of said arresting member (30) and is rotatably attached to said bracket (10a) to face and be engaged with said arresting member (30); and
a coil spring (70) is hooked between lower ends of said arresting member (30) and said check member (40) to resiliently support said arresting member (30) and said check member (40).

10. A device for stooping car headrests, comprising:
a housing (10) having a stay (22) of a headrest (20) pivotably arranged therein;
a main spring (50) provided in said housing (10) to bias said stay (22) in a forward direction;
an arresting member (30) resiliently and rotatably fixed to said housing (10) to releasably hold said stay (22); and
a check member (40) resiliently and rotatably engaged with said arresting member (30) for controlling operation of said arresting member (30) and having a release means, wherein
said stay (22) comprises parallel vertical portions (221) with a head support member (21) of the headrest (20) attached to upper portions thereof, a horizontal portion (222) connecting lower ends of said vertical portions, and a pair of hinge pieces (23) having respective shaft holes (231) and fixed apart to a front face of said horizontal portion (222);
said housing (10) is in the form of a box without a top and a rear wall and with two side walls (1) having a pair of opposite guide grooves (12) with a wide upper portion and a narrow lower portion and hinge holes (13) to be aligned with said shaft holes (231) of said stay (22), and a front wall (15b) between said side walls (11), said horizontal portion (222) of said stay (22) being accommodated and pivoted in said guide grooves;
said main spring (50) is hooked in said housing (10) using one of said hinge holes (13) of said housing (10) to apply a resilient force for pivoting and stooping said stay (22) forward;
said arresting member (30) has a holding groove (32) at an upper portion thereof and a locking recess (34a) at a lower portion thereof and is rotatably attached to an inner surface of one of said side walls (11) so that said holding groove (32) may be aligned with said guide grooves (12);
said check member (40) has a jaw (42a) to be engaged with said locking recess (34a) of said arresting member (30), and is rotatably attached to the inner surface of said side wall (11) to face and be engaged with said arresting member (30); and
a coil spring (70) is hooked between lower ends of said arresting member (30) and said check member (40) to resiliently support said arresting member (30) and said check member (40).

11. The device as claimed in claim 10, wherein a rocking-prevention bracket (10b) is provided on an inner surface of said front wall (15a) of the housing (10) to support said horizontal portion (222) of the stay (22) when the headrest (20) is in an upright state.

12. The device as claimed in claim 11, wherein an elastic member (101) is provided on a top of said rocking-prevention bracket (10b).

13. The device as claimed in claim 12, wherein said elastic member (101) is made of one selected from the group consisting of rubber, synthetic rubber and a spring.

14. The device as claimed in claim 1, wherein said stay (22) comprises parallel vertical portions (221) and a lower horizontal portion (222) formed as a unitary body.

15. The device as claimed in claim 1, wherein
said stay (22) comprises parallel vertical portions (221) slidably coupled in sleeve housings (61) so that they may be vertically lifted or lowered,
said sleeve housings being vertically mounted on housing cases arranged in a backrest of the car seat and a lower horizontal portion (222) with both ends fixed to housing cases (60),
said horizontal portion (222) being formed separately from said vertical portions.

16. The device as claimed in claim 1, wherein a rocking-prevention bracket (10b) is provided on an inner surface of a front wall (15a) of the housing (10) to support a horizontal portion (222) of the stay (22) when the headrest (20) is in the upright state.

17. The device as claimed in claim 16, wherein an elastic member (101) is provided on a top of said rocking-prevention bracket (10b).

18. The device as claimed in claim 17, wherein said elastic member (101) is made of one selected from the group consisting of rubber, synthetic rubber and a spring.

* * * * *